June 7, 1949.   W. K. KEARSLEY ET AL   2,472,376
ELECTRIC CELL OF THE IMMERSION TYPE
Filed June 11, 1946

INVENTORS.
WILLIAM K. KEARSLEY
ARTHUR F. WINSLOW
HERMAN A. LIEBHAFSKY
BY
ATTORNEY

Patented June 7, 1949

2,472,376

UNITED STATES PATENT OFFICE 2,472,376

ELECTRIC CELL OF THE IMMERSION TYPE

William K. Kearsley, Schenectady, Arthur F. Winslow, Scotia, and Herman A. Liebhafsky, Schenectady, N. Y., assignors, by mesne assignments, to the United States of America as represented by the Secretary of the Navy Application June 11, 1946, Serial No. 675,858

2 Claims. (Cl. 136—90)

This invention relates to electrolytic devices for producing an electric current and pertains particularly to assembled batteries which may be stored indefinitely in a dry state but which become reactive immediately upon immersion in sea water or other electrolyte.

An object of the invention is to provide an electrolytic cell unreactive in a dry state but capable upon immersion in water of sustaining for a brief period a current of sufficient magnitude to cause a standard light filament to glow.

Another object of the invention is the provision of an electrolytic cell capable of producing its optimum electrical output in sea water of any temperature.

An additional object is to provide an electrolytic cell capable of calm operation unaccompanied by the evolution of a gas.

A further object of the invention is to provide an electrolytic sea cell of compact construction which may be quickly and easily assembled.

Figure 1:
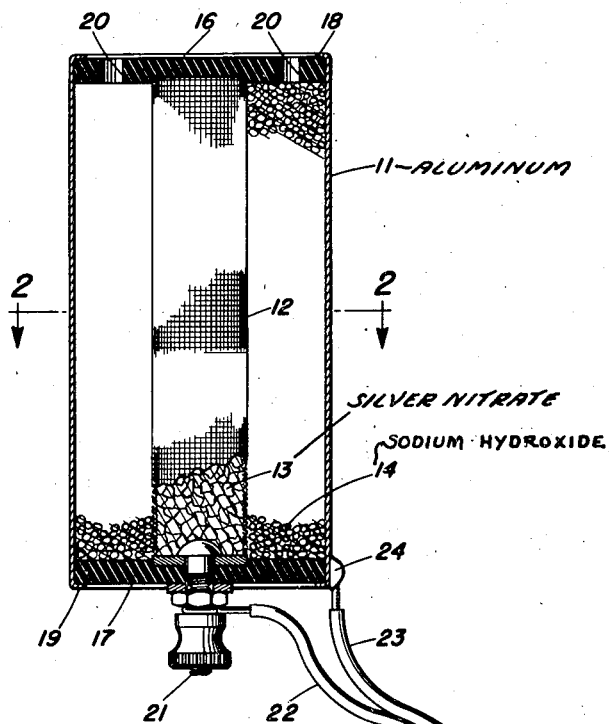
Figure 2:
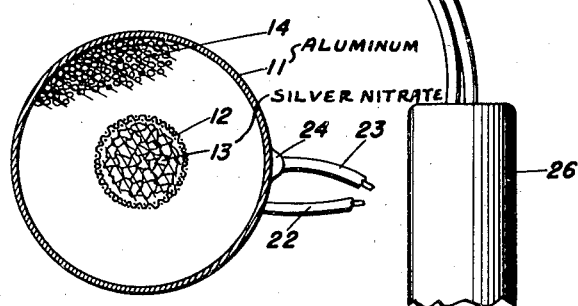

Other and ancillary objects and advantages of the invention, and the manner in which they may be attained, will become apparent from the following detailed specification and the accompanying drawings, in which:

Fig. 1 is a longitudinal sectional view of a preferred embodiment of the electrolytic cells of the present invention, and Fig. 2 is a cross-sectional view of the cell depicted in Fig. 1, taken along line 2—2 of Fig. 1.

In the drawings, reference numeral 11 denotes an aluminum anode, preferably of circular cross-section, which also serves a structural function as a casing for the cell assembly. Concentrically disposed within the anode is a perforated or woven copper cathode 12, also preferably of circular cross-section, which contains a quantity of depolarizing crystals 13, preferably of silver nitrate. A quantity of solid sodium hydroxide, or other salt capable of forming an alkaline electrolyte upon solution in water, completely fills the annular space between the anode 11 and the cathode 12. The exterior of the cell assembly is completed by end pieces 16 and 17 of rubber, organic plastic, or other insulating material, and restrained against outward axial movement by crimps 18 and 19 in anode 11. Ports 20 afford communication between the interior and the exterior of the cell assembly. A conventional binding post 21, electrically connected with the cathode 12, provides a point of connection to that electrode for one lead wire 22. A second lead wire 23 is connected directly to the other electrode (anode) by a solder connection 24. An electric detonator 26 connected to the electrodes of the cell by lead wires 22 and 23 receives the electrical current generated by the cell upon its immersion in water.

Operation of the cell is simple and its electrical output quickly initiated. When the cell is immersed, water enters through ports 20 and dissolves the dry electrolyte (sodium hydroxide) 14 forming a true electrolyte between the electrodes 11 and 12. The current produced by the potential difference between the electrodes is conducted by means of lead wires 22 and 23 to a suitable electric detonator imbedded in the fuze of an underwater explosive device, causing it to detonate. The electrolytic action of the cell is accompanied by the deterioration of the aluminum anode with the probably formation of sodium aluminate. Hydrogen is prevented from forming in the cathode and polarizing the cell by the presence of the depolarizer, silver nitrate, the silver of which is reduced and deposited on the cathode.

When immersed in water, the cell above described will produce an electromotive force of nearly 1.6 volts, and will sustain a current of 200–300 milliamperes through a standard two-cell flashlight filament for several seconds.

It is obvious, of course, that many modifications in the cells of the present invention can be made without departing from the spirit thereof. For example, although we prefer to use sodium hydroxide as the electrolyte and silver nitrate as the depolarizer in our cells, any alkali metal hydroxide, such as lithium or potassium hydroxide, may be effectively used instead of sodium hydroxide, and ferric chloride or chromium trioxide may be substituted for the silver nitrate.

The term "dry electrolyte" has been employed in the specification and claims to denote a dry chemical compound capable of forming an electrolyte upon solution in water.

We claim:

1. An electric cell unreactive in the dry state but operative upon immersion in water comprising an aluminum case, a perforated copper cylinder within said case, a quantity of substantially dry sodium hydroxide interposed between said case and said cylinder, and a quantity of substantially dry silver nitrate within said cylinder, said sodium hydroxide adapted to dissolve upon immersion of said cell in water whereby to connect electrolytically said aluminum case and said copper cylinder causing an electrical potential difference therebetween.

2. An electric cell unreactive in the dry state but operative upon immersion in water comprising an aluminum case, a perforated copper cylinder within said case, insulating closing means for the ends of said case, at least one of said closing means having perforations therein, a quantity of substantially dry sodium hydroxide interposed between said case and said cylinder, and a quantity of substantially dry silver nitrate within said cylinder, said perforations adapted upon immersion of said cell to admit water to the interior thereof whereby the sodium hydroxide is dissolved to form an electrolyte between said aluminum case and said copper cylinder resulting in a difference in electrical potential therebetween.

WILLIAM K. KEARSLEY.
ARTHUR F. WINSLOW.
HERMAN A. LIEBHAFSKY.

REFERENCES CITED

The following references are of record in the file of this patent:

UNITED STATES PATENTS

| Number | Name | Date |
|---|---|---|
| 1,830,234 | Martus et al. | Nov. 3, 1931 |
| 2,001,978 | Ruben | May 21, 1935 |

FOREIGN PATENTS

| Number | Country | Date |
|---|---|---|
| 397,475 | Great Britain | Aug. 22, 1933 |
| 399,561 | Great Britain | Oct. 9, 1933 |